US011353955B1

(12) United States Patent
Burgess et al.

(10) Patent No.: US 11,353,955 B1
(45) Date of Patent: Jun. 7, 2022

(54) SYSTEMS AND METHODS FOR USING SCENE UNDERSTANDING FOR CALIBRATING EYE TRACKING

(71) Applicant: Facebook Technologies, LLC, Menlo Park, CA (US)

(72) Inventors: Kirk Erik Burgess, Newark, CA (US); Sebastian Sztuk, Menlo Park, CA (US)

(73) Assignee: Facebook Technologies, LLC, Menlo Park, CA (US)

( * ) Notice: Subject to any disclaimer, the term of this patent is extended or adjusted under 35 U.S.C. 154(b) by 0 days.

(21) Appl. No.: 17/116,762

(22) Filed: Dec. 9, 2020

Related U.S. Application Data

(63) Continuation of application No. 16/420,983, filed on May 23, 2019, now Pat. No. 10,871,823.

(51) Int. Cl.
*G06F 3/01* (2006.01)
*G06T 7/70* (2017.01)

(52) U.S. Cl.
CPC ............... *G06F 3/013* (2013.01); *G06T 7/70* (2017.01)

(58) Field of Classification Search
CPC ........... A61B 3/10; A61B 3/024; A61B 3/113; A61B 3/0091; A61B 3/028; A61B 5/0476; A61B 5/165; A61B 5/04845; A61B 5/024; A61B 5/04842; A61B 5/11; G06F 3/147; G06F 3/0346; G06F 3/013; G02B 27/0172; G02B 27/0093; G02B 27/017; G02B 2027/0138; G02B 6/105; G02B 6/0016; A63F 13/25; A63F 13/212; G16H 50/20; G16H 40/60; G09G 5/006; G09G 2320/0693; G09G 2354/00; G02F 1/2955; G02F 2201/307
See application file for complete search history.

(56) References Cited

U.S. PATENT DOCUMENTS

| | | | | |
|---|---|---|---|---|
| 10,338,677 B2 * | 7/2019 | Guenter | ................. | H04N 7/183 |
| 2014/0055591 A1 * | 2/2014 | Katz | ...................... | G06F 3/013 348/78 |
| 2015/0092983 A1 * | 4/2015 | Nguyen | .................. | G06T 7/277 382/103 |
| 2015/0234460 A1 * | 8/2015 | Irie | ......................... | G06F 3/013 345/156 |

(Continued)

OTHER PUBLICATIONS

Corrected Notice of Allowance on U.S. Appl. No. 16/420,983 dated Oct. 9, 2020.

(Continued)

*Primary Examiner* — Christopher E Leiby
(74) *Attorney, Agent, or Firm* — Foley & Lardner LLP (57) ABSTRACT

A system can include one or more processors that determine a first position of an object in view of a user of a head mounted display (HMD) and a first gaze direction towards the first position. The object can be detected by one or more sensors. The one or more processors detect that the user is gazing at the object. The one or more processors determine, responsive to detecting that the user is gazing at the object, a second gaze direction based on at least a second position of one or more eyes of the user of the HMD provided via an eye tracking operation of the HMD. The one or more processors calibrate, based at least on a difference between the first gaze direction and the second gaze direction, the eye tracking operation of the HMD.

17 Claims, 4 Drawing Sheets

(56) References Cited

U.S. PATENT DOCUMENTS

| | | | |
|---|---|---|---|
| 2017/0123492 A1* | 5/2017 | Marggraff | H04N 5/247 |
| 2017/0263007 A1* | 9/2017 | Cavin | G06K 9/50 |
| 2017/0290504 A1* | 10/2017 | Khaderi | A61B 5/165 |
| 2018/0232048 A1* | 8/2018 | Popovich | G02F 1/2955 |
| 2019/0287493 A1* | 9/2019 | Neustein | G09G 5/373 |
| 2020/0051320 A1* | 2/2020 | Laffont | G06F 3/013 |
| 2020/0257360 A1* | 8/2020 | Klingstrom | G06T 19/00 |

OTHER PUBLICATIONS

Non-Final Office Action on U.S. Appl. No. 16/420,983 dated Mar. 16, 2020.

Notice of Allowance on U.S. Appl. No. 16/420,983 dated Aug. 19, 2020.

* cited by examiner

SYSTEMS AND METHODS FOR USING SCENE UNDERSTANDING FOR CALIBRATING EYE TRACKING

CROSS-REFERENCE TO RELATED APPLICATIONS

The present application is a continuation of U.S. patent application Ser. No. 16/420,983, filed May 23, 2019, the disclosure of which is incorporated herein by reference in its entirety.

FIELD OF THE DISCLOSURE

The present disclosure relates generally to augmented reality (AR) systems. More particularly, the present disclosure relates to systems and methods for using scene understanding for calibrating eye tracking.

BACKGROUND

The present disclosure relates generally to augmented reality (AR) systems. AR systems can be used to present various images, including three-dimensional (3D) images, to a user. For example, AR headsets can be used to present images to the user in a manner that is overlaid on a view of a real world environment. To render convincing, life-like AR images, the AR systems can use eye tracking to track the user's eye and accordingly present images.

SUMMARY

Various aspects of the present disclosure relate to systems and methods that can use scene understanding to calibrate eye tracking, such as eye tracking operations used in head-mounted display (HMD) devices. For example, the system can detect and use a real object in a scene to continuously calibrate and optimize the eye tracking operation. The eye tracking system is capable of re-calibrating if the positions of the HMD or other parts of the system have moved/deformed/changed during use. The eye tracking system can include a camera or sensor for detecting a position of a real world object in the view of a user, at least one eye sensor configured to detect a position of at least one eye, and a processor for determining that the user is looking at the object and determining a difference between a gaze direction determined using the detected position of the at least one eye and a gaze direction from the user to the real world object using the determined position of the real world object. The difference is used to calibrate the eye tracking system. For example, two gaze vectors corresponding to the gaze direction from each eye to the real world object can be compared to the gaze direction determined using the eye tracking operation, such that a relatively small difference between the gaze vectors and the gaze direction determined using the eye tracking operation can provide the system with relatively greater confidence that the eye tracking operation is properly calibrated (or vice versa). The difference can be continuously determined and used to calibrate the eye tracking operation.

The system can determine that the user is looking at the real world object according to a number of techniques including but not limited to directing the user's attention to the object; determining that a user is engaged with an operation related to the object; determining that the user is talking to another person; determining that the user is writing or drawing using the object; determining that the user is picking up or holding the object; detecting that the user is reading text associated with the object; determining that the user is viewing a display (e.g., watching television or a portable electronic device); determining that the object is generating a visual or audio stimulus (e.g., a phone, speaker, or other electronic device outputting a noise, such as a ring); identifying the object to be a moving object that the eyes of the user follow (such as by monitoring movement of the eyes over a previous period of time); or various combinations thereof. The location of the object can be provided by a database, by the object itself, or via sensors.

In some embodiments, the eye tracking system is used to confirm the correct vergence plane of an object. Information related to the vergence plane can be used to drive or position a varifocal optical system (e.g., mechanical, liquid lens or polarization beam splitter plate (PBP)). The information related to the vergence plane can also be used to blur objects in augmented reality that are at different depths than the vergence plane. The eye tracking calibration can be used to dynamically update uniformity of a waveguide of the HMD, such as to correct rendering and projector output. The eye tracking calibration can be used to control foveated rendering.

At least one aspect of the present disclosure relates to a method for calibrating eye tracking operation. The method can include determining, by one or more processors of a head mounted display (HMD), a first position of an object in view of a user of the HMD and a first gaze direction towards the first position. The object can be detected by one or more sensors. The method can include detecting, by the one or more processors, that the user is gazing at the object. The method can include determining, by the one or more processors responsive to detecting that the user is gazing at the object, a second gaze direction based on at least a second position of one or more eyes of the user of the HMD provided via an eye tracking operation of the HMD. The method can include calibrating, by the one or more processors, based at least on a difference between the first gaze direction and the second gaze direction, the eye tracking operation of the HMD.

At least one aspect of the present disclosure relates to a system. The system can include one or more processors configured determine a first position of an object in view of a user of a head mounted display (HMD) and a first gaze direction towards the first position. The object can be detected by one or more sensors. The one or more processors can be configured to detect that the user is gazing at the object. The one or more processors can be configured to determine, responsive to detecting that the user is gazing at the object, a second gaze direction based on at least a second position of one or more eyes of the user of the HMD provided via an eye tracking operation of the HMD. The one or more processors can be configured to calibrate, based at least on a difference between the first gaze direction and the second gaze direction, the eye tracking operation of the HMD.

At least one aspect of the present disclosure relates to a computer-readable medium that includes processor-executable instructions that when executed by one or more processors, cause the one or more processors to determine a first position of an object in view of a user of a head-mounted display (HMD) and a first gaze direction towards the first position. The object can be detected by one or more sensors. The instructions can cause detecting that the user is gazing at the object. The instructions can cause determining, responsive to detecting that the user is gazing at the object, a second gaze direction based on at least a second position of one or more eyes of the user of the HMD provided via an eye tracking operation of the HMD. The instructions can cause calibrating, based at least on a difference between the first gaze direction and the second gaze direction, the eye tracking operation of the HMD.

These and other aspects and implementations are discussed in detail below. The foregoing information and the following detailed description include illustrative examples of various aspects and implementations, and provide an overview or framework for understanding the nature and character of the claimed aspects and implementations. The drawings provide illustration and a further understanding of the various aspects and implementations, and are incorporated in and constitute a part of this specification.

BRIEF DESCRIPTION OF THE DRAWINGS

The accompanying drawings are not intended to be drawn to scale. Like reference numbers and designations in the various drawings indicate like elements. For purposes of clarity, not every component can be labeled in every drawing. In the drawings.

DETAILED DESCRIPTION

Before turning to the figures, which illustrate certain embodiments in detail, it should be understood that the present disclosure is not limited to the details or methodology set forth in the description or illustrated in the figures. It should also be understood that the terminology used herein is for the purpose of description only and should not be regarded as limiting.

AR systems can use an HMD (may also be referred to as a head-worn display (HWD)) to present images to a user at appropriate depth. The HMD can determine depth information for objects or features in a scene and render those objects and features at the determined depth (e.g., at least partially in response to the depth information). For example, the HMD can be used to present images that can be viewed stereoscopically, such as by sequentially or simultaneously presenting left eye images and right eye images, enabling a user to perceive a 3D environment. The HMD or the AR system can include one or more cameras that capture images from multiple perspectives, such as left eye and right eye images.

The HMD or AR system can use an eye tracking operation, which can be at least partially operated by a processor, eye tracking sensors, or combinations thereof, to monitor or track positions and orientations of eyes of a user of the HMD. For example, the eye tracking operation can be used to determine a direction that the user is gazing. The eye tracking operation can provide the direction information to components of the HMD or AR system that are used to present the images to the user, such as to determine where the images are to be displayed relative to the eyes of the user. In some instances, there can be differences between where the eye tracking operation determines the direction to be and where the direction that the user is gazing actually is, which can reduce the effectiveness of the HMD or AR system. For example, the HMD may deform change in shape, such as if the HMD is dropped or exposed to temperature changes or by putting on and taking off the HMD. The eye tracking operation can be affected by transient changes, such as if the HMD moves relative to the head of the user (e.g., while the user is chewing or if the user adjusts the position of the HMD). The eye tracking operation can be affected by bending during use of the HMD, wear, dust, or debris. The eye tracking operation can be affected by longer term changes in the structure, performance, and operation of the HMD over the life time of usage of the HMD (which may result from exposure to various temperatures or other environmental effects).

Systems and methods in accordance with certain aspects of the present solution can use scene understanding to calibrate eye tracking, such as eye tracking operations used in HMD devices or AR systems. In some embodiments, a system can include one or more processors configured determine a first position of an object in view of a user of a head mounted display (HMD) and a first gaze direction towards the first position. The object can be detected by one or more sensors. The one or more processors can be configured to detect that the user is gazing at the object. The one or more processors can be configured to determine, responsive to detecting that the user is gazing at the object, a second gaze direction based on at least a second position of one or more eyes of the user of the HMD provided via an eye tracking operation of the HMD. The one or more processors can be configured to calibrate, based at least on a difference between the first gaze direction and the second gaze direction, the eye tracking operation of the HMD. The system can use the difference information along with other indicators regarding the gaze directions and eye tracking operation to determine how to calibrate the eye tracking operation.

In some embodiments, the system can determine scene understanding based on locations of objects in a scene or environment around the HMD or AR system, such as by using sensor data from cameras or depth sensors. The system can determine that the user is interacting with one or more objects based on the sensor data, such as by determining that the user is holding or moving the object, gazing at the object, or reading text associated with the object. The system can determine that the user is interacting with the object based on the object being the only object in a threshold range of the gaze direction of the user. The system can determine that the user is interacting with the object based on audio cues, such as by detecting that the object is outputting sound. The system can calibrate a varifocal system using the gaze direction information as a vergence cue, such as by using the gaze direction or the position of the object to estimate a vergence plane so that the varifocal system can adjust focus to match the vergence plane. The system can operate machine learning models for eye tracking, calibration, and or calibration slip compensation. The system can selectively calibrate the eye tracking operation using confidence scores indicating high certainty that the user is gazing at the object. The system can use the eye tracking calibration to identify pupil locations for correcting rendering and projector output by the HMD, such as to enable dynamic uniformity correction of one or more waveguides of the HMD. The system can perform foveated rendering using the calibration of the eye tracking.

Figure 1:
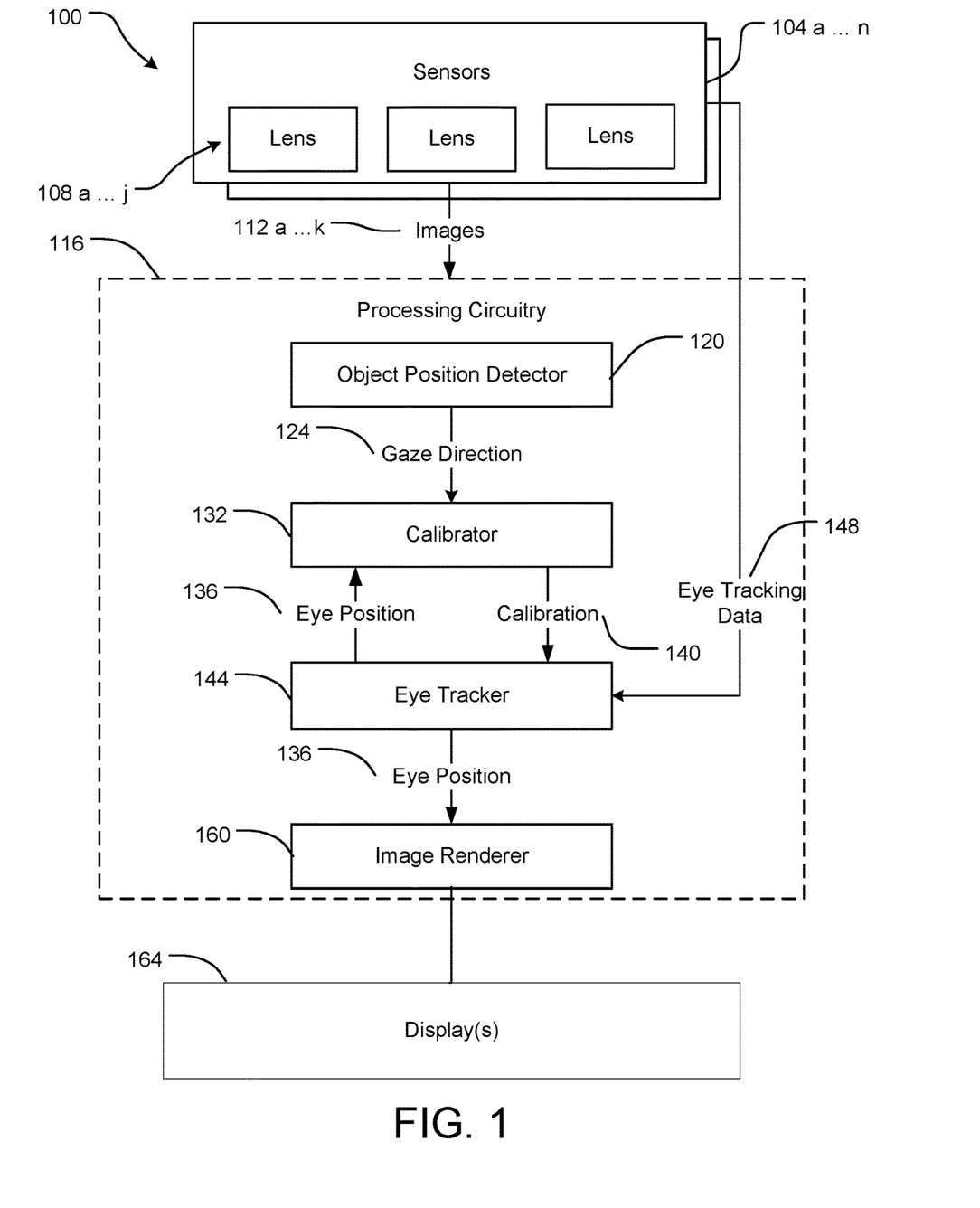
FIG. 1 is a block diagram of a display system according to an implementation of the present disclosure.

Referring now to FIG. 1, a system 100 can include a plurality of sensors 104a . . . n, processing circuitry 116, and one or more displays 164. The system 100 can be implemented using the HMD system 200 described with reference to FIG. 2. The system 100 can be implemented using the computing environment described with reference to FIG. 4. The system 100 can incorporate features of and be used to implement features of virtual reality (VR) systems. At least some of the processing circuitry 116 can be implemented using a graphics processing unit (GPU). The functions of the processing circuitry 116 can be executed in a distributed manner using a plurality of processing units.

The processing circuitry 116 may include one or more circuits, processors, and/or hardware components. The processing circuitry 116 may implement any logic, functions or instructions to perform any of the operations described herein. The processing circuitry 116 can include any type and form of executable instructions executable by any of the circuits, processors or hardware components. The executable instructions may be of any type including applications, programs, services, tasks, scripts, libraries processes and/or firmware. Any of the object position detector 120, calibrator 132, eye tracker 144, or image renderer 160 may be any combination or arrangement of circuitry and executable instructions to perform their respective functions and operations. At least some portions of the processing circuitry 116 can be used to implement image processing executed by the sensors 104.

The sensors 104a . . . n can be image capture devices or cameras, including video cameras. The sensors 104a . . . n may be cameras that generate images of relatively low quality (e.g., relatively low sharpness, resolution, or dynamic range), which can help reduce the SWAP of the system 100. For example, the sensors 104a . . . n can generate images having resolutions on the order of hundreds of pixels by hundreds of pixels. At the same time, the processes executed by the system 100 as described herein can be used to generate display images for presentation to a user that have desired quality characteristics, including depth characteristics.

The sensors 104a . . . n (generally referred herein as sensors 104) can include any type of one or more cameras. The cameras can be visible light cameras (e.g., color or black and white), infrared cameras, or combinations thereof. The sensors 104a . . . n can each include one or more lenses 108 a . . . j generally referred herein as lens 108). In some embodiments, the sensor 104 can include a camera for each lens 108. In some embodiments, the sensor 104 include a single camera with multiple lenses 108 a . . . j. In some embodiments, the sensor 104 can include multiple cameras, each with multiple lenses 108. The one or more cameras of the sensor 104 can be selected or designed to be a predetermined resolution and/or have a predetermined field of view. In some embodiments, the one or more cameras are selected and/or designed to have a resolution and field of view for detecting and tracking objects, such as in the field of view of a HMD for augmented reality. The one or more cameras may be used for multiple purposes, such as tracking objects in a scene or an environment captured by the image capture devices and performing the calibration techniques described herein.

The one or more cameras of the sensor 104 and lens 108 may be mounted, integrated, incorporated or arranged on an HMD to correspond to a left-eye view of a user or wearer of the HMD and a right-eye view of the user or wearer. For example, an HMD may include a first camera with a first lens mounted forward-facing on the left side of the HMD corresponding to or near the left eye of the wearer and a second camera with a second lens mounted forward-facing on the right-side of the HMD corresponding to or near the right eye of the wearer. The left camera and right camera may form a front-facing pair of cameras providing for stereographic image capturing. In some embodiments, the HMD may have one or more additional cameras, such as a third camera between the first and second cameras an offers towards the top of the HMD and forming a triangular shape between the first, second and third cameras. This third camera may be used for triangulation techniques in performing the depth buffer generations techniques of the present solution, as well as for object tracking.

The system 100 can include a first sensor (e.g., image capture device) 104a that includes a first lens 108a, the first sensor 104a arranged to capture a first image 112a of a first view, and a second sensor 104b that includes a second lens 108b, the second sensor 104b arranged to capture a second image 112b of a second view. The first view and the second view may correspond to different perspectives, enabling depth information to be extracted from the first image 112a and second image 112b. For example, the first view may correspond to a left eye view, and the second view may correspond to a right eye view. The system 100 can include a third sensor 104c that includes a third lens 108c, the third sensor 104c arranged to capture a third image 112c of a third view. As described with reference to FIG. 2, the third view may correspond to a top view that is spaced from an axis between the first lens 108a and the second lens 108b, which can enable the system 100 to more effectively handle depth information that may be difficult to address with the first sensor 104a and second sensor 104b, such as edges (e.g., an edge of a table) that are substantially parallel to the axis between the first lens 108a and the second lens 108b.

Light of an image to be captured by the sensors 104a . . . n can be received through the one or more lenses 108 a . . . j. The sensors 104a . . . n can include sensor circuitry, including but not limited to charge-coupled device (CCD) or complementary metal-oxide-semiconductor (CMOS) circuitry, which can detect the light received via the one or more lenses 108a . . . j and generate images 112a . . . k based on the received light. For example, the sensors 104a . . . n can use the sensor circuitry to generate the first image 112a corresponding to the first view and the second image 112b corresponding to the second view. The one or more sensors 104a . . . n can provide the images 112a . . . k to the processing circuitry 116. The one or more sensors 104a . . . n can provide the images 112a . . . k with a corresponding timestamp, which can facilitate synchronization of the images 112a . . . k when image processing is executed on the images 112a . . . k, such as to identify particular first the second images 112a, 112b representing first and second views and having the same timestamp that should be compared to one another to calculate gaze information.

Figure 2:
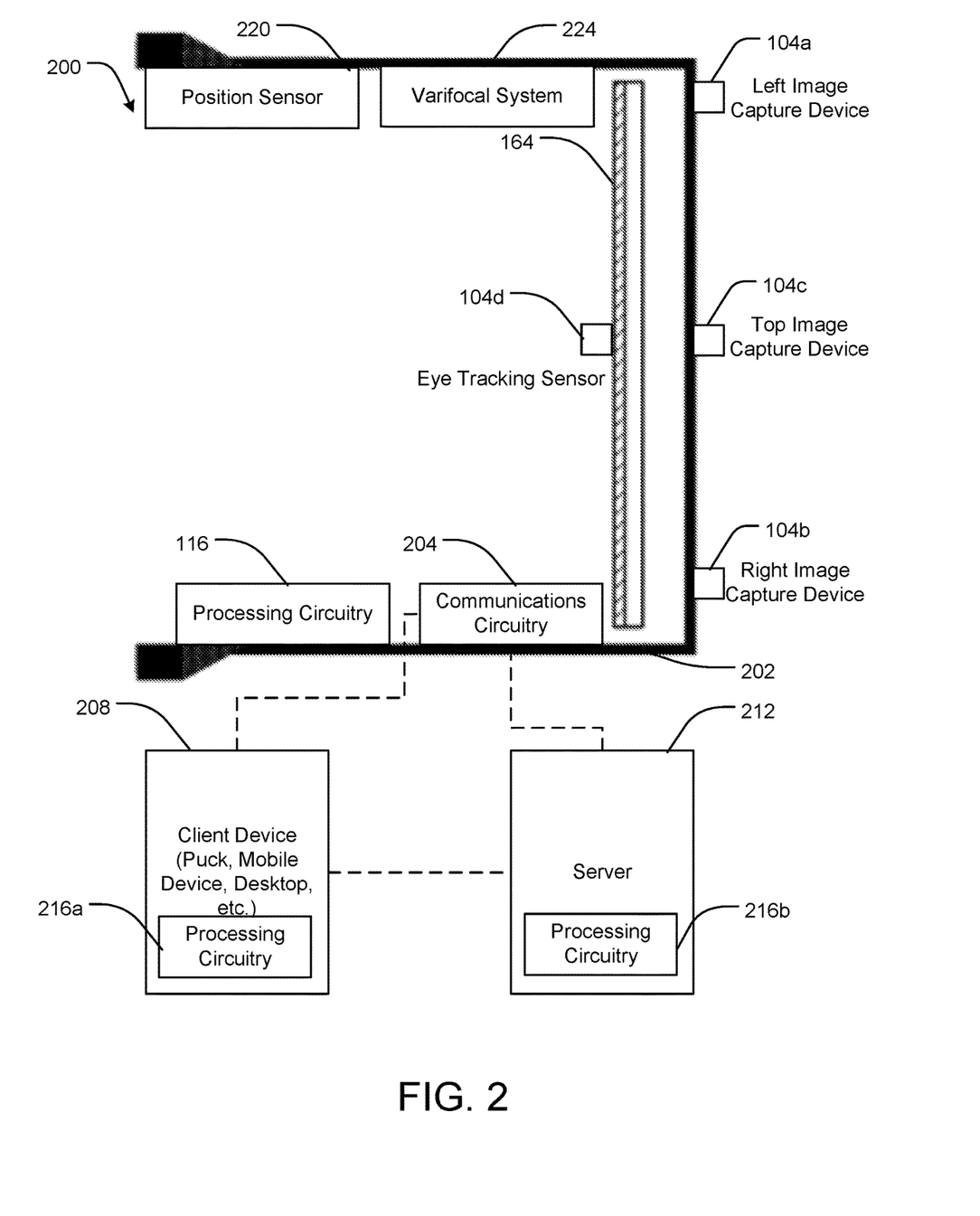
FIG. 2 is a schematic diagram of a head-mounted display (HMD) system according to an implementation of the present disclosure.

The sensors 104 can include eye tracking sensors 104 or head tracking sensors 104 that can provide information such as positions, orientations, or gaze directions of the eyes or head of the user (e.g., wearer) of an HMD. In some embodiments, the sensors 104 are inside out tracking cameras configured to provide images for head tracking operations. The sensors 104 can be eye tracking sensors 104 that provide eye tracking data 148, such as data corresponding to at least one of a position or an orientation of one or both eyes of the user. The sensors 104 can be oriented in a direction towards the eyes of the user (e.g., as compared to sensors 104 that capture images of an environment outside of the HMD). For example, the sensors 104 can include at least one fourth sensor 104d (e.g., as illustrated in FIG. 2) which can be oriented towards the eyes of the user to detect sensor data regarding the eyes of the user.

In some embodiments, the sensors 104 output images of the eyes of the user, which can be processed to detect an eye position or gaze direction (e.g., first gaze direction) of the eyes. In some embodiments, the sensors 104 process image data regarding the eyes of the user, and output the eye position or gaze direction based on the image data. In some embodiments, the sensors 104 optically measure eye motion, such as by emitting light (e.g., infrared light) towards the eyes and detecting reflections of the emitted light.

As discussed further herein, an eye tracking operation can include any function, operation, routine, logic, or instructions executed by the system 100 or components thereof to track data regarding eyes of the user, such as positions or orientations (e.g., gaze directions) of the eyes of the user as the eyes of the user move during use of the HMD. For example, the eye tracking operation can be performed using at least one of one or more sensors 104 or eye tracker 144. For example, the eye tracking operation can process eye tracking data 148 from the sensor 104 to determine an eye position 136 of eye(s) of the user. In some embodiments, the eye tracking operation can be performed using an eye tracker 144 that is implemented using a portion of processing circuitry 116 that is coupled with, mounted to, integral with, implemented using a same circuit board as, or otherwise provided with the one or sensors 104 that detect sensor data regarding the eyes of the user (and may be implemented using different processing hardware than at least one of the object position detector 120, calibrator 132, or image renderer 160). In some embodiments, the eye tracking operation can be performed using an eye tracker 144 that receives sensor data by a wired or wireless connection from the one or more sensors 104 that are configured to detect sensor data regarding the eyes of the user (e.g., images of the eyes of the user); for example, the eye tracker 144 can be implemented using the same processing hardware as at least one of the object position detector 120, calibrator 132, or image renderer 160. Various such combinations of sensor hardware of the sensors 104 and/or processing hardware of the processing circuitry 116 may be used to implement the eye tracking operation.

The eye tracker 144 can generate the eye position 136 in various manners. For example, the eye tracker 144 can process the eye tracking data 148 to identify one or more pixels representing at least one of a position or an orientation of one or more eyes of the user. The eye tracker 144 can identify, using the eye tracking data 148, the eye position 136 based on pixels corresponding to light (e.g., light from sensors 104, such as infrared or near-infrared light from sensors 104, such as 850 nm light eye tracking) reflected by the one or more eyes of the user. The eye tracker 144 can use light from various illumination sources or reflections in the HMD or AR system, such as from waveguides, combiners, or lens cameras. The eye tracker 144 can determine the eye position 136 or gaze direction by determining a vector between a pupil center of one or more eyes of the user and a corresponding reflection (e.g., corneal reflection). The eye position 136 can include position data such as at least one of a position or an orientation of each of one or more eyes of the user. The position data can be in three-dimensional space, such as three-dimensional coordinates in a Cartesian, spherical, or other coordinate system. The eye position 136 can include position data including a gaze direction of one or more eyes of the user.

In some embodiments, the eye tracker 144 includes a machine learning model. The machine learning model can be used to generate the eye position 136 based on eye tracking data 148. For example, the eye tracking data 148 can be applied as an input to the machine learning model, which can output the eye position 136 (or a gaze direction of the eye position 136). The machine learning model can be trained using training data that include historical eye tracking data 148 and corresponding historical or labeled eye positions 136, such as eye positions 136 that were determined to correspond to the eye tracking data 148. The machine learning model can be continuously updated using the eye tracking data 148 to enable continuous calibration of the eye tracking operation. The machine learning model can be trained by monitoring a difference between candidate output generated by the machine learning model and the historical eye positions 136, and modifying the machine learning model to reduce the difference. For example, an objective function or cost function can be evaluated using the difference, and the machine learning model can be modified using the objective function or cost function. In some embodiments, the machine learning model includes a neural network. The neural network can include a plurality of layers each including one or more nodes (e.g., neurons, perceptrons), such as a first layer (e.g., an input layer), a second layer (e.g., an output layer), and one or more hidden layers. The neural network can include characteristics such weights and biases associated with computations that can be performed between nodes of layers, which the processing circuitry 116 can modify to train the neural network using the training data.

The sensors 104 can capture images 112 of an environment around the sensors 104. For example, the sensors 104 can capture images 112 of an environment in or around a field of view of the user of the HMD. The images 112 can be representations of the environment, such as color or grayscale array or matrix of pixels representing parameters of light captured from the environment (e.g., color, brightness, intensity). The environment can be an indoor or outdoor environment, including both natural and man-made structures, terrain, or other objects, including sky, clouds, roads, buildings, streets, pedestrians, or cyclists. The environment can include one or more objects (e.g., real-world objects), which can be represented by the images 112 captured by the sensors.

The processing circuitry 116 can include an object position detector 120. The object position detector 120 can receive the image 112 from the sensors 104. The object position detector 120 can process the image 112 or portions thereof to detect one or more objects represented by the image 112. For example, the object position detector 120 can detect or identify objects represented by the image 112 by processing elements of the image 112 such as pixels or groups of pixels, such as by processing pixels or groups of pixels indicating colors, shapes, edges, contrast between pixels or groups of pixels, and spatial relationships between pixels. The object position detector 120 can detect objects by executing spatial filters, segmentation, or machine learning models trained to detect objects. The object position detector 120 can identify candidate objects from the image 112, such as groups of pixels representing edges, compare the candidate objects to one or more template objects (e.g., template objects or features thereof in an object database), and identify the objects of the image 112 based on candidate objects that match template objects. The object position detector 120 can apply various objection recognition algorithms or models to identify the objects. The objects can be real-world or simulated objects.

In some embodiments, the object position detector 120 does not specifically identify a type, class, or other identifier of the object in the image 112. The object position detector 120 can receive an indication from the sensors 104 that the object has been detected by the sensors 104. For example, the object position detector 120 can receive an indication that a particular image 112 represents an object (in which case the object position detector 120 can process the image 112 to identify one or more pixels corresponding to the object). In some embodiments, the indication can include one or more pixels corresponding to the object.

In some embodiments, the object position detector 120 detects the object using an object database that can include location data of various objects, buildings, structures, roads, or other indoor and outdoor features. For example, the object position detector 120 can communicate with an object database mapping objects or features of objects to position data. The object database may also maintain semantic or textual information regarding objects, such as information regarding type, class, shape, color, size, or other features regarding the objects. The object database can be based on reconstruction of environments using image data (which can be updated using images 112 detected by the sensors 104). The object database can be maintained, processed (e.g., to generate semantic or textual information or descriptors), and updated by a server remote from the system 100, which the system 100 can communicate with to access the object database. The object position detector 120 can receive data regarding the position of the HMD or AR system (e.g., from position sensor 220 described with reference to FIG. 2), and use the data to retrieve one or more candidate objects from the object database. The object position detector 120 can compare the sensor data to the one or more candidate objects and information maintained by the object database regarding the one or more candidate objects to identify the object (e.g., by matching the sensor data to the information received from the object database).

The object position detector 120 can determine a position of the object using information received from the sensors 104, such as the image 112 or the indication that the image 112 represents an object. For example, the object position detector 120 can identify one or more pixels corresponding to the object. In some embodiments, the object position detector 120 determines the position of the object as a position in an image space of the image 112, such as by assigning one or more pixels corresponding to the object as the position of the object. In some embodiments, the object position detector 120 determines the position of the object as a position in three-dimensional space (e.g., real world space, AR or VR space, space in the environment around the HMD or AR system), such as by using depth information to determine the position of the object.

The object position detector 120 can determine a gaze direction using the position of the object, such as a gaze direction towards the position of the object. For example, the object position detector 120 can identify an expected position of the eyes of the user, and determine a vector from the eyes of the user to the position of the object (or vice versa). In some embodiments, the expected position includes a left eye position and a right eye position, and the object position detector 120 can determine the gaze direction using the left eye position and the right eye position, such as by averaging the left eye position and the right eye position, or averaging respective vectors from the left eye position to the position of the object and from the right eye position to the position of the object.

The processing circuitry 116 can detect that the user is gazing at the object. For example, the processing circuitry 116 can use sensor data regarding the eyes of the user or scene understanding, such as contextual information, to detect that the user is gazing at the object (e.g., as compared to other objects that the object position detector 120 has not determined the position of). The processing circuitry 116 can use any combination of sensor data to detect that the user is gazing at the object, such as by assigning a confidence score to each object regarding whether the user is gazing at the object, and determine the confidence score as a weighted average from contributions of the sensor data. The processing circuitry 116 can compare the confidence score to a threshold confidence, and detect that the user is gazing at the object responsive to the confidence score meeting or exceeding the threshold confidence. In some embodiments, the processing circuitry 116 assigns a relatively higher confidence score to the object based on the object being one of at most a threshold number of objects in the scene (e.g., in a field of view of the HMD). For example, if the object is the only object in the scene, then there may be a greater likelihood that the user is gazing at the object. If the object is detected to be or include a face, such as another person speaking, there may be a greater likelihood that the user is gazing at the object.

The processing circuitry 116 can monitor positions of a plurality of objects, and detect whether the user is gazing at one or more of the plurality of objects, which can be used by the calibrator 132 as described below to determine differences between gaze directions corresponding to the plurality of objects and gaze directions or eye positions 136 from the eye tracker 144 to calibrate the eye tracker 144.

In some embodiments, the processing circuitry 116 can detect that the user is gazing at the object by identifying features of interest corresponding to the object, such as text data. The processing circuitry 116 can process the image 112 representing the object to determine whether there is text data corresponding to the object. The processing circuitry 116 can detect that the user is gazing at the object responsive to identifying text data of the object. The processing circuitry 116 can detect that the user is gazing at the object based on the user providing the text data, such as if the user is writing. Similarly, the processing circuitry 116 can detect that the user is gazing at the object based on detecting movement of one or more hands of the user in a particular manner, such as by detecting that the user is writing or drawing based on the movement of the hands and resulting changes in the scene (e.g., the movement of the hands corresponding to drawn or written objects in a vicinity of the hands).

The processing circuitry 116 can detect that the user is gazing at the object based on an interaction of the user with the object. For example, the processing circuitry 116 can identify one or more hands of the user in the images 112, monitor the one or more hands, and determine that the user is interacting with the object based on the one or more hands contacting or intersecting the object (e.g., at least one pixel corresponding to the one or more hands is within a threshold distance of the object, such as a threshold distance less than or equal to 10 pixels, less than or equal to 5 pixels, less than or equal to 2 pixels, or less than or equal to 1 pixel). For example, the processing circuitry 116 can detect that the user is gazing at the object based on the user picking up a glass of water using image data of the sensor data indicating that hands of the user are interacting with the glass of water. The processing circuitry 116 can detect that the user is gazing at the object based on determining that the one or more hands of the user are moving the object, such as if the object is a controller, racket, or ball.

The processing circuitry 116 can detect that the user is gazing at the object based on the object being a moving object, such as by determining that the object has come into view of the sensors 104. For example, the processing circuitry 116 can determine that the object is present in an image received from the sensors 104 and was not present in a previous image received from the sensors 104. The processing circuitry 116 can determine whether the object is present by tracking one or more pixels corresponding to the object across images. The processing circuitry 116 can determine that the object is a moving object by detecting motion of the object, such as by determining that the one or more pixels corresponding to the object have different positions between images.

In some embodiments, the processing circuitry 116 prompts the user to gaze at the detected object. For example, the processing circuitry 116 can generate a prompt that includes at least one of a visual cue, an audio cue, or a text cue regarding the detected object. The prompt can indicate the position of the detected object. For example, the visual cue can be presented in a manner overlaying the detected object, which can guide the user to gaze at the detected object. The visual cue can include a color, change in brightness, outline, or other cue that can be used to direct attention to the object. The processing circuitry 116 can generate the prompt to include a plurality of visual cues, such as an animation.

The processing circuitry 116 can include a calibrator 132. The calibrator 132 can calibrate the eye tracking operation, such as by providing calibration instructions to at least one of the eye tracker 144 or the sensors 104 that are used for the eye tracking operation. The calibrator 132 can generate calibration instructions that can indicate a change in angle, orientation, position, or other parameters associated with eye tracking.

In some embodiments, the calibrator 132 determines a gaze direction (e.g., second gaze direction) of the user based on information received from the eye tracking operation, such as an eye position 136 received from the eye tracker 144. The eye position 136 can include at least one of a position or an orientation of one or more eyes of the user. The calibrator 132 can determine the gaze direction using the eye position 136 by identifying one or more directions corresponding to a line of sight of the eye(s) of the user, such as directions that are perpendicular to a target point on one or both eyes of the user. The eye position 136 can include or indicate the gaze direction, in some embodiments.

The calibrator 132 can calibrate the eye tracking operation using the gaze direction 124 and the gaze direction determined based on at least the eye position 136. For example, the calibrator 132 can compare the gaze directions to determine a difference between the gaze directions. The difference can be a difference in angles, such as a difference in one or more angles of a coordinate system used to represent the gaze directions. The difference can be a vector, such as a vector resulting from comparing (e.g., subtracting) the gaze directions.

The calibrator 132 can calibrate the eye tracking operation by generating the calibration 140 based on the difference and providing the calibration 140 to the eye tracker 144. For example, the calibrator 132 can generate the calibration 140 to cause the eye tracker 144 to adjust one or more parameters that the eye tracker 144 uses to generate the eye position 136, such as parameters that the eye tracker 144 applies to the eye tracking data 148 to determine the eye position 136.

In some embodiments, the calibrator 132 monitors a confidence score of at least one of scene understanding regarding the object or detecting that the user is gazing at the object. For example, the confidence score regarding the object can correspond to a confidence that the object is identified correctly (e.g., based on a match score of image data regarding the object to template image data). The confidence score of detecting that the user is gazing at the object can correspond to a confidence that the user is gazing at the object (e.g., based on the sensor data used to determine that the user is gazing at the object). The calibrator 132 can provide the calibration 140 to the eye tracker 144 responsive to the confidence score meeting or exceeding a respective threshold, which can enable the calibrator 132 to selectively re-calibrate the eye tracker 144 when there is a relatively high certainty that the object has been properly identified and that the user is gazing at the object.

In some embodiments, the calibrator 132 uses vergence cues to determine how to calibrate the eye tracker 144 or a varifocal system (e.g., varifocal system 224 described with reference to FIG. 2). For example, the calibrator 132 can determine a vergence plane (e.g., first vergence plane) based on the gaze direction 124, determine a vergence plane (e.g., second vergence plane) based on the gaze direction corresponding to the eye position 136, and calibrate the eye tracker 144 based on a difference between the vergence planes. The vergence planes can correspond to planes perpendicular to the respective gaze directions (e.g., planes where lines of sight from the eyes would meet). The calibrator 132 can provide the vergence plane or instructions to adjust the vergence plane to the varifocal system 224, enabling the varifocal system 224 to modify a focus using the information received from the calibrator 132.

The calibrator 132 can calibrate the eye tracking operation in a continuous or semi-continuous manner, such as by recalibrating the eye tracking operation periodically or responsive to changes in use of the HMD or AR system or the environment around the HMD or AR system. In some embodiments, the calibrator 132 periodically calibrates the eye tracking operation. For example, the calibrator 132 can initiate a timer responsive to providing calibration instructions to the eye tracker 144, and re-calibrate or update the eye tracking operation, responsive to the timer exceeding a predetermined threshold time, using updated values of the gaze direction 124 and eye position 136.

In some embodiments, the calibrator 132 monitors at least one of motion data of the HMD or AR system (e.g., using position sensor 220 described with reference to FIG. 2) or motion data of objects in view of the HMD or AR system. The calibrator 132 can compare the motion data (e.g., position, orientation, velocity, acceleration data) to one or more respective thresholds, and re-calibrate or update the eye tracking operation using updated values of the gaze direction 124 and eye position 136 responsive to the motion data exceeding the one or more respective thresholds. The calibrator 132 can prompt the user to gaze at an object responsive to the motion data exceeding the one or more respective thresholds.

In some embodiments, the calibrator 132 maintains a slip compensation model. The slip compensation model can monitor the difference between the gaze direction of the eye position 136 and the gaze direction 124, and cause the calibrator 132 to calibrate the eye tracker 144 responsive to the difference exceeding a threshold. In some embodiments, the slip compensation model includes a machine learning model, such as a neural network. The slip compensation model can be trained to determine when to cause the calibrator 132 to calibrate the eye tracker 144, such as by training the slip compensation to determine the threshold. For example, training data can be provided to the slip compensation model that includes differences between gaze directions 124 and eye positions 136 (or gaze directions of eye positions 136) along with labeled indications of when the differences are too large, such as labeled indications corresponding to user feedback.

The processing circuitry 116 can include an image renderer 160. The image renderer 160 can be a 3D image renderer. The image renderer 160 may use image related input data to process, generate and render display or presentation images to display or present on one or more display devices, such as via an HMD. The image renderer 160 can generate or create 2D images of a scene or view for display on display 164 and representing the scene or view in a 3D manner. The display or presentation data to be rendered can include geometric models of 3D objects in the scene or view. The image renderer 160 may determine, compute or calculate the pixel values of the display or image data to be rendered to provide the desired or predetermined 3D image(s), such as 3D display data for the images 112 captured by the sensor 104. The image renderer 160 can receive the images 112 and receive the eye position 136, and generate display images using the images 112 and the eye position 136, such as to determine where to locate augmented reality information for presentation by displays 164 based on the eye position 136 (or gaze direction corresponding to the eye position 136).

The image renderer 160 can render frames of display data to one or more displays 164 based on temporal and/or spatial parameters. The image renderer 160 can render frames of image data sequentially in time, such as corresponding to times at which images are captured by the sensors 104. The image renderer 160 can render frames of display data based on changes in position and/or orientation to the sensors 104, such as the position and orientation of the HMD. The image renderer 160 can render frames of display data based on left-eye view(s) and right-eye view(s) such as displaying a left-eye view followed by a right-eye view or vice-versa.

The image renderer 160 can generate the display images using motion data regarding movement of the sensors 104a . . . n that captured the images 112a . . . k. For example, the sensors 104a . . . n may change in at least one of position or orientation due to movement of a head of the user wearing an HMD that includes the sensors 104a . . . n (e.g., as described with reference to HMD system 200 of FIG. 2). The processing circuitry 116 can receive the motion data from a position sensor (e.g., position sensor 220 described with reference to FIG. 2). The image renderer 160 can use the motion data to calculate a change in at least one of position or orientation between a first point in time at which the images 112a . . . k were captured and a second point in time at which the display images will be displayed, and generate the display images using the calculated change. The image renderer 160 can use the motion data to interpolate and/or extrapolate the display images relative to the images 112a . . . k.

Although the image renderer 160 is shown as part of the processing circuitry 116, the image renderer may be formed as part of other processing circuitry of a separate device or component, such as the display device, for example within the HMD.

The system 100 can include one or more displays 164. The one or more displays 164 can be any type and form of electronic visual display. The displays may have or be selected with a predetermined resolution and refresh rate and size. The one or more displays can be of any type of technology such as LCD, LED, ELED or OLED based displays. The form factor of the one or more displays may be such to fit within the HMD as glasses or goggles in which the display(s) are the leans within the frame of the glasses or goggles. The displays 164 may have a refresh rate the same or different than a rate of refresh or frame rate of the processing circuitry 116 or the image renderer 160 or the sensors 104. The displays 164 can include one or more waveguides (e.g., waveguides 228 described with reference to FIG. 2), such that calibration of the eye tracking operation can be used to more accurately control operation of the waveguides using pupil locations indicated by the eye tracking.

Referring now to FIG. 2, in some implementations, an HMD system 200 can be used to implement the system 100. The HMD system 200 can include an HMD body 202, a left sensor 104a (e.g., left image capture device), a right sensor 104b (e.g., right image capture device), and the display 164. The HMD body 202 can have various form factors, such as glasses or a headset. The sensors 104a, 104b can be mounted to or integrated in the HMD body 202. The left sensor 104a can capture first images corresponding to a first view (e.g., left eye view), and the right sensor 104b can capture images corresponding to a second view (e.g., right eye view).

The HMD system 200 can include a top sensor 104c (e.g., top image capture device). The top sensor 104c can capture images corresponding to a third view different than the first view or the second view. For example, the top sensor 104c can be positioned between the left sensor 104a and right sensor 104b and above a baseline between the left sensor 104a and right sensor 104b. This can enable the top sensor 104c to capture images with depth information that may not be readily available to be extracted from the images captured by the left and right sensors 104a, 104b. For example, it may be difficult for depth information to be effectively extracted from images captured by the left and right sensors 104a, 104b in which edges (e.g., an edge of a table) are parallel to a baseline between the left and right sensors 104a, 104b. The top sensor 104c, being spaced from the baseline, can capture the third image to have a different perspective, and thus enable different depth information to be extracted from the third image, than the left and right sensors 104a, 104b.

The HMD system 200 can include processing circuitry 116, which can perform at least some of the functions described with reference to FIG. 1, including receiving sensor data from the sensors 104a, 104b, and 104c as well as eye tracking sensors 104, and processing the received images to calibrate an eye tracking operation.

The HMD system 200 can include communications circuitry 204. The communications circuitry 204 can be used to transmit electronic communication signals to and receive electronic communication signals from at least one of a client device 208 or a server 212. The communications circuitry 204 can include wired or wireless interfaces (e.g., jacks, antennas, transmitters, receivers, transceivers, wire terminals) for conducting data communications with various systems, devices, or networks. For example, the communications circuitry 204 can include an Ethernet card and port for sending and receiving data via an Ethernet-based communications network. The communications circuitry 204 can communicate via local area networks (e.g., a building LAN), wide area networks (e.g., the Internet, a cellular network), and/or conduct direct communications (e.g., NFC, Bluetooth). The communications circuitry 204 can conduct wired and/or wireless communications. For example, the communications circuitry 204 can include one or more wireless transceivers (e.g., a Wi-Fi transceiver, a Bluetooth transceiver, a NFC transceiver, a cellular transceiver). For example, the communications circuitry 204 can establish wired or wireless connections with the at least one of the client device 208 or the server 212. The communications circuitry 204 can establish a USB connection with the client device 208.

The HMD system 200 can be deployed using different architectures. In some embodiments, the HMD (e.g., HMD body 202 and components attached to the HMD body 202) comprises the processing circuitry 116 and is self-contained portable unit. In some embodiments, the HMD has portions of the processing circuitry 116 that work in cooperation with or in conjunction with any type of portable or mobile computing device or companion device that has the processing circuitry or portions thereof, such as in the form of a staging device, a mobile phone or wearable computing device. In some embodiments, the HMD has portions of the processing circuitry 116 that work in cooperation with or in conjunction with processing circuitry, or portions thereof, of a desktop computing device. In some embodiments, the HMD has portions of the processing circuitry 116 that works in cooperation with or in conjunction with processing circuitry, or portions thereof, of a server computing device, which may be deployed remotely in a data center or cloud computing environment. In any of the above embodiments, the HMD or any computing device working in conjunction with the HMD may communicate with one or more servers in performing any of the functionality and operations described herein.

The client device 208 can be any type and form of general purpose or special purpose computing device in any form factor, such as a mobile or portable device (phone, tablet, laptop, etc.), or a desktop or personal computing (PC) device. In some embodiments, the client device can be a special purpose device, such as in the form of a staging device, which may have the processing circuitry or portions thereof. The special purpose device may be designed to be carried by the user while wearing the HMD, such as by attaching the client device 208 to clothing or the body via any type and form of accessory attachment. The client device 208 may be used to perform any portion of the image and rendering processing pipeline described in connection with FIGS. 1 and 3. The HMD may perform some or other portions of the image and rendering processing pipeline such as image capture and rendering to the display 164. The HMD can transmit and receive data with the client device 208 to leverage the client device 208's computing power and resources which may have higher specifications than those of the HMD.

The server 212 can be any type of form of computing device that provides applications, functionality or services to one or more client devices 208 or other devices acting as clients. In some embodiments, the server 212 can be a client device 208. The server 212 can be deployed in a data center or cloud computing environment accessible via one or more networks. The HMD and/or client device 208 can use and leverage the computing power and resources of the server 212. The HMD and/or client device 208 can implement any portion of the image and rendering processing pipeline described in connection with FIGS. 1 and 3. The server 212 can implement any portion of the image and rendering processing pipeline described in connection with FIGS. 1 and 3, and in some cases, any portions of the image and rendering processing pipeline not performed by client device 208 or HMD. The server 212 may be used to update the HMD and/or client device 208 with any updated to the applications, software, executable instructions and/or data on the HMD and/or client device 208.

The system 200 can include a position sensor 220. The position sensor 220 can output at least one of a position or an orientation of the body 202. As the image capture devices 104a, 104b, 104c can be fixed to the body 202 (e.g., at predetermined locations relative to the position sensor 220), the position sensor 220 can output at least one of a position or an orientation of each sensor 104a, 104b, 104c. The position sensor 220 can include at least one of an inertial measurement unit (IMU), an accelerometer, a gyroscope, or a magnetometer (e.g., magnetic compass).

The system 200 can include a varifocal system 224. The varifocal system 224 can have a variable focal length, such that the varifocal system 224 can change a focus (e.g., a point or plane of focus) as focal length or magnification changes. The varifocal system 224 can include at least one of a mechanical lens, liquid lens, or polarization beam plate. As discussed above, the varifocal system 224 can be calibrated by the processing circuitry 116 (e.g., by calibrator 132), such as by receiving an indication of a vergence plane from the calibrator 132 which can be used to change the focus of the varifocal system 224. In some embodiments, the varifocal system 224 can enable a depth blur of one or more objects in the scene by adjusting the focus based on information received from the calibrator 132 so that the focus is at a different depth than the one or more objects.

In some embodiments, the display 164 includes one or more waveguides 228. The waveguides 228 can receive (e.g., in-couple) light corresponding to display images to be displayed by the display 164 from one or more projectors 232, and output (e.g., out-couple) the display images, such as for viewing by a user of the HMD. The waveguides 228 can perform horizontal or vertical expansion of the received light to output the display images at an appropriate scale. The waveguides 228 can include one or more lenses, diffraction gratings, polarized surfaces, reflective surfaces, or combinations thereof to provide the display images based on the received light. The projectors 232 can include any of a variety of projection devices, such as LCD, LED, OLED, DMD, or LCOS devices, among others, to generate the light to be provided to the one or more waveguides 228. The projectors 232 can receive the display images from the processing circuitry 116 (e.g., from image renderer 160). The one or more waveguides 228 can be provided through a display surface (e.g., glass), which can be at least partially transparent to operate as a combiner (e.g., combining light from a real world environment around the HMD with the light of the outputted display images).

Operation of the display 164 and components thereof, such as the one or more waveguides 228 or the one or more projectors 232, can be modified or controlled responsive to the calibration of the eye tracking operation. For example, the processing circuitry 116 an cause the one or more projectors 232 to provide the display images using the one or more waveguides 228 based on a pupil location corresponding to each eye of the user based on the calibrated eye tracking operation. The processing circuitry 116 can use the calibrated eye tracking operation to correct uniformity of the one or more waveguides 228 so that the display images provided via the one or more waveguides 228 are aligned with the gaze directions of the eyes of the user.

The display 164 can perform foveated rendering based on the calibrated eye tracking operation, which can indicate a gaze point corresponding to the gaze direction generated by the eye tracking operation. For example, the processing circuitry 116 can identify at least one of a central region of the FOV of the display 164 (e.g., a plurality of pixels within a threshold distance from the gaze point) peripheral region of the FOV of the display 164 based on the gaze point (e.g., a peripheral region represented by a plurality of pixels of the display images that are within a threshold distance of an edge of the display images or more than a threshold distance from the gaze point). The processing circuitry 116 can generate the display images to have a less quality (e.g., resolution, pixel density, frame rate) in the peripheral region than in the central region, which can reduce processing demand associated with operation of the HMD system 200.

Figure 3:
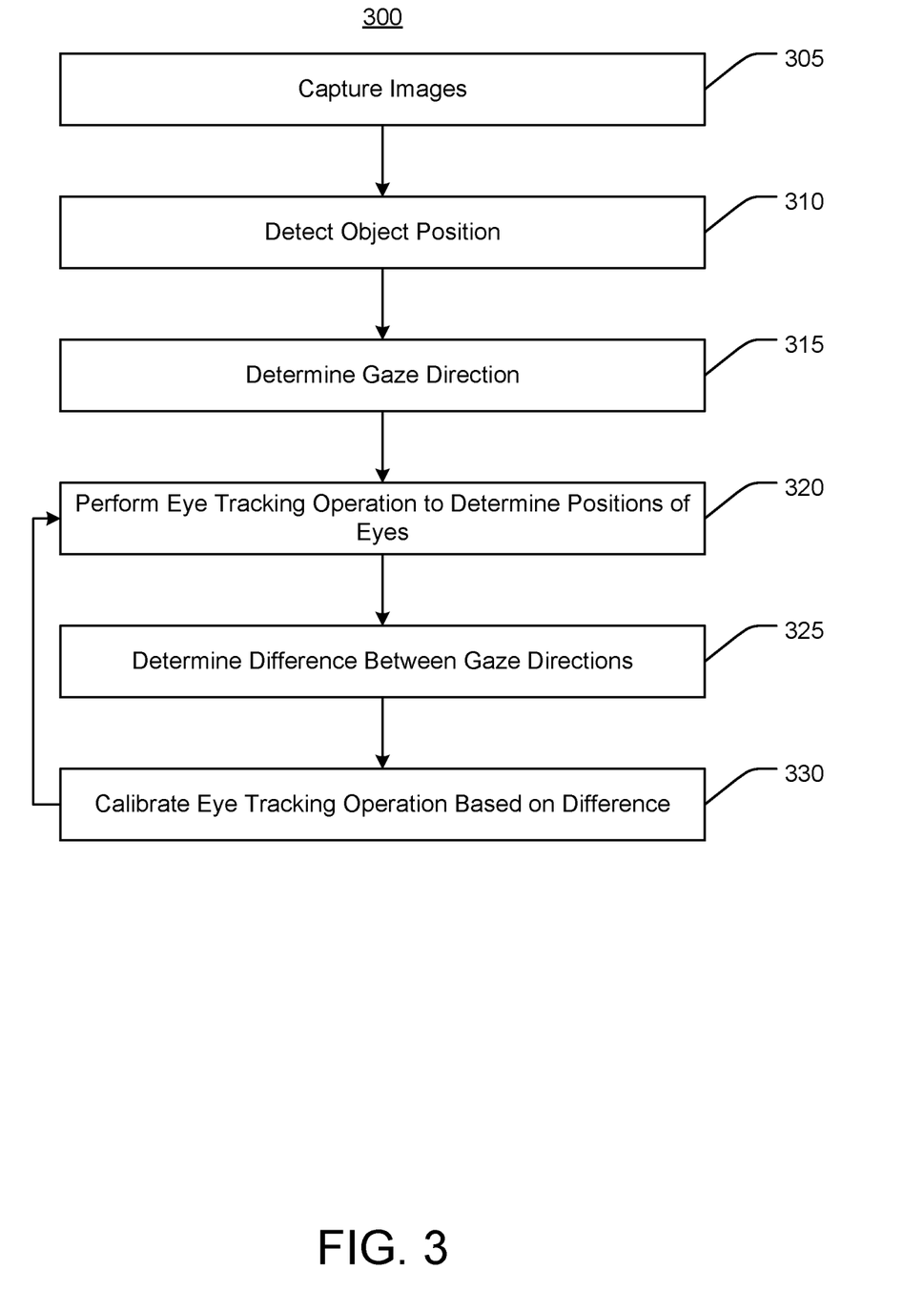
FIG. 3 is a flow diagram of a method of using scene understanding for calibrating eye tracking according to an implementation of the present disclosure.

Referring now to FIG. 3, a method for using scene understanding for calibration eye tracking is illustrated. In some embodiments, a method 300 can include one or more of the following steps. The method 300 can include capturing one or more images of an object in a scene (305). The method can include detecting a position of an object detected in the scene (310). The method can include determining a gaze direction based on the position of the object (315). The method can include performing an eye tracking operation to track eyes of a user to determine positions of the eyes (320). The method can include determining a difference between the gaze direction and a gaze direction of the positions of the eyes (325). The method can include calibrating the eye tracking operation based on the difference (330).

At 305, one or more images of an object in a scene can be captured. The images can be captured responsive to operation of an HMD or AR system. The images can include one or more pixels representing the scene, including the object. The images can be captured continuously. The images can be captured at a predetermined frame rate. The images can be captured by depth sensors, cameras, or video cameras. The images can be captured via lens(es) through which light is received to generate the images, such as by using image sensors. The images can be captured using sensors mounted, integrated, incorporated or arranged on an HMD to correspond to a left-eye view of a user or wearer of the HMD and a right-eye view of the user or wearer.

At 310, a position of an object detected in the scene is determined. The object can be detected using the captured images. The images or portions thereof can be processed to detect or identify the object. For example, elements of the image, such as pixels or groups of pixels, can be processed to detect the image based on colors, shapes, edges, contrast between pixels or groups of pixels, and spatial relationships between pixels. The object can be detected using spatial filters, segmentation, or machine learning models trained to detect objects. The object can be detected by comparing candidate objects or portions thereof (e.g., one or more pixels representing features from the images) to template objects in a database and detecting the object responsive to matching the candidate object to the template object. The database can include location data of various objects, buildings, structures, roads, or other indoor and outdoor features, as well as textual or semantic information regarding objects, which can be used to match the objects to detect the object in the scene. In some embodiments, a confidence score is assigned to the detected object, indicating a likelihood that the detected object is accurately detected.

The position of the detected object can be determined based on one or more pixels representing the object. For example, responsive to detecting the object, the one or more pixels used to detect the object can be retrieved to determine the position of the object. The one or more pixels can be used to represent the position of the object in an image space (e.g., a coordinate system corresponding to the pixels of the image). Depth information can be applied to the one or more pixels to determine the position of the object in three-dimensional space, such as real-world or simulated space.

At 315, a gaze direction of one or more eyes of the user can be determined based on the determined position of the object. The gaze direction can indicate a direction that the eyes of the user would be oriented in order to gaze at the object, such as a line of sight to the position of the object. The gaze direction can be determined as an angle, vector, or other data structure representing a direction from the one or more eyes to the determined position of the object (or vice versa).

The gaze direction can be determined responsive to determining that the user is gazing at the object. For example, sensor data regarding the eyes of the user or the scene (e.g., contextual information), can be used to detect that the user is gazing at the object. A confidence score can be assigned to the determination of whether the user is gazing at the object, so that calibration of the eye tracking operation as discussed herein can be selectively performed when there is relatively high confidence or certainty that a gaze direction determined based on the position of the object corresponds to where the user is gazing. The user can be determined to be gazing at the object based on detecting information such as the user interacting with the object (e.g., holding the object, moving the object, writing on or near the object, drawing on or near the object). The user can be determined to be gazing at the object based on audio information, such as audio information indicating the object is outputting sound, or is a real-world or simulated person speaking. In some embodiments, the user can be prompted to gaze at the object, such as by providing visual, audio, or text cues that direct attention to the object (e.g., a visual overlay on the object).

At 320, an eye tracking operation is performed to track the one or more eyes of the user. The eye tracking operation can use sensor data regarding at least one of position or orientation of the eyes of the user, which may be received from sensors oriented towards the eyes of the user. The eye tracking operation can output an eye position of the one or more eyes of the user, which may include or be processed to determine a gaze direction corresponding to the tracked eye position (e.g., a gaze direction perpendicular to a particular point of the one or more eyes of the user). The eye tracking operation can be performed on a continuous or periodic basis, such as to continuously update the eye position responsive to changes in the eye position as the user shifts gaze among various objects in the scene. The eye tracking operation can be performed using a machine learning model trained to generate eye position data based on sensor data regarding the one or more eyes of the user.

At 325, a difference is determined between the gaze directions. For example, a difference can be determined between the gaze direction determined based on the position of the object, and a gaze direction determined based on the eye tracking operation. The difference between the gaze directions can indicate whether the eye tracking operation should be re-calibrated to more accurately provide the eye position or gaze direction.

At 330, the eye tracking operation can be calibrated based on the difference. For example, a change in a parameter associated with eye tracking, such as angle, orientation, or position, can be provided to the eye tracking operation. In some embodiments, the eye tracking operation is calibrated responsive to a confidence score of at least one of scene understanding regarding the object or detecting that the user is gazing at the object meeting or exceeding a threshold, which can enable calibration to be selectively performed when is a relatively high certainty that the object has been properly identified and that the user is gazing at the object. In some embodiments, the eye tracking operation is calibrated periodically or responsive to movement of the HMD or AR system.

In some embodiments, a varifocal system is calibrated based on gaze direction information. For example, the gaze directions can be used to determine a vergence plane of the eyes of the user, and the vergence plane can be provided to the varifocal system to cause the varifocal system to adjust a focus based on the vergence plane. In some embodiments, a display (e.g., projector or one or more waveguides) is calibrated based on gaze direction information. For example, the gaze directions can be used to adjust pupil locations used for presenting display images to the user, or to perform foveated rendering by determining where to locate a peripheral region of the display images based on the gaze directions, where the peripheral region can have lesser image quality than a remaining portion (e.g., central region) of the display images.

The method 300 or steps or operations thereof can be performed based on various conditions. In some embodiments, the method 300 is used to perform an initial calibration of the HMD or AR system. For example, the method 300 can be performed responsive to detecting that the HMD or AR system is in an initialization, restart, or setup mode. In some embodiments, the method 300 is performed on a periodic basis. For example, a schedule that indicates points in time can be monitored, and the method 300 can be performed responsive to detecting that a point in time of the schedule is tolled. The method 300 can be performed based on monitoring parameters such as a duration of usage of the HMD or AR system (e.g., recalibrate after every hour of usage), motion data of the HMD or of objects in the scene (e.g., recalibrate responsive to motion of the HMD being greater than a motion threshold), the difference between gaze directions being greater than a corresponding threshold, or temperature change over a duration of time being greater than a corresponding threshold. The method 300 can be performed responsive to user input, such as user input indicating instructions to recalibrate the eye tracking operation. The method 300 can be performed responsive to updates to firmware or software of the HMD or AR system or the eye tracking operation. The method 300 can be performed based on any of a variety of machine learning models used by the HMD or AR system, such as a machine learning model used to perform eye tracking (e.g., to determine eye position based on eye tracking sensor data), or a slip compensation model that monitors the difference between gaze directions.

Figure 4:
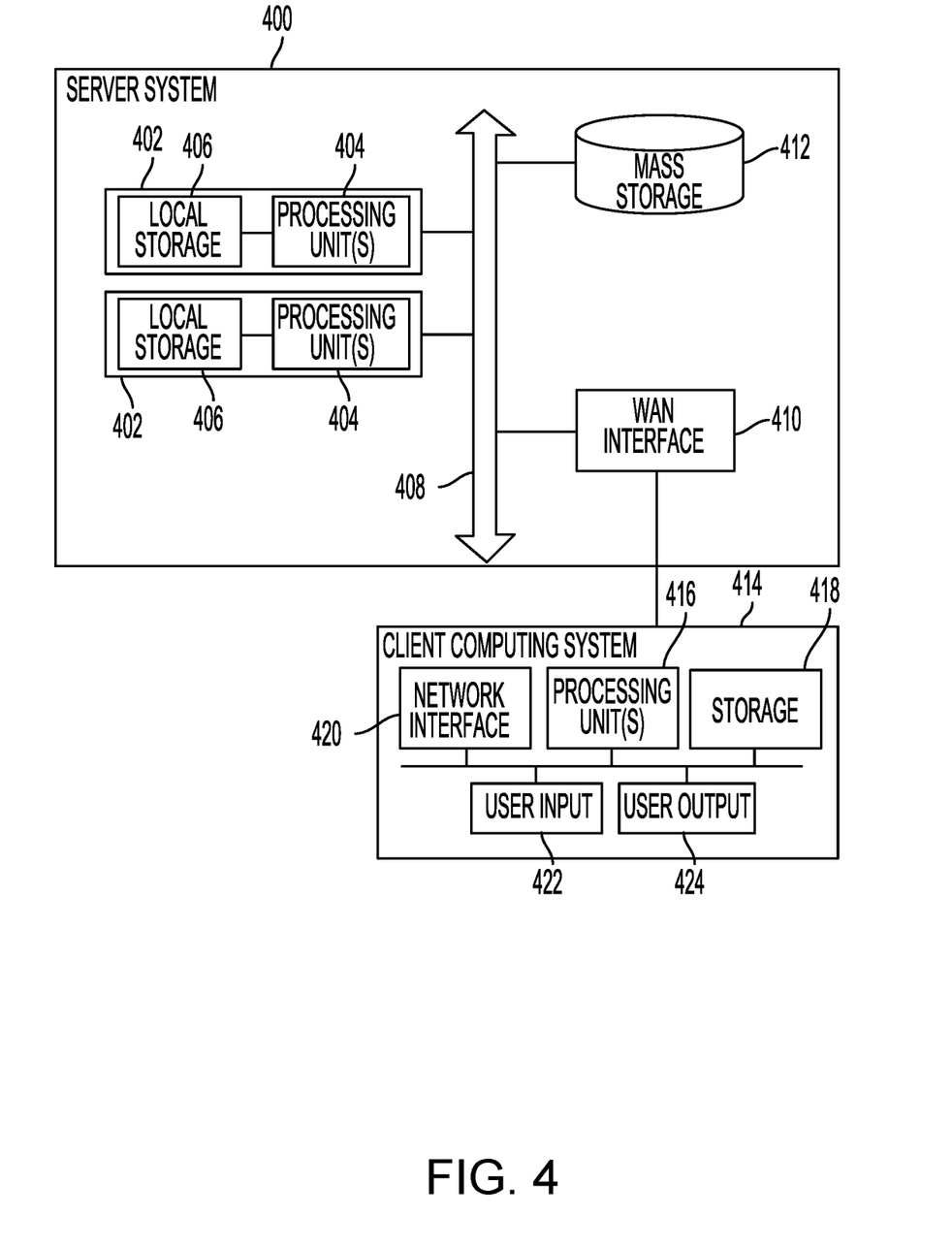
FIG. 4 is a block diagram of a computing environment according to an implementation of the present disclosure.

Various operations described herein can be implemented on computer systems. FIG. 4 shows a block diagram of a representative server system 400 and client computer system 414 usable to implement the present disclosure. Server system 400 or similar systems can implement services or servers described herein or portions thereof. Client computer system 414 or similar systems can implement clients described herein. Each of the systems 100, 200 and others described herein can incorporate features of the systems 400, 414.

Server system 400 can have a modular design that incorporates a number of modules 402 (e.g., blades in a blade server); while two modules 402 are shown, any number can be provided. Each module 402 can include processing unit(s) 404 and local storage 406.

Processing unit(s) 404 can include a single processor, which can have one or more cores, or multiple processors. Processing unit(s) 404 can include a general-purpose primary processor as well as one or more special-purpose co-processors such as graphics processors, digital signal processors, or the like. Some or all processing units 404 can be implemented using customized circuits, such as application specific integrated circuits (ASICs) or field programmable gate arrays (FPGAs). Such integrated circuits execute instructions that are stored on the circuit itself. Processing unit(s) 404 can execute instructions stored in local storage 406. Any type of processors in any combination can be included in processing unit(s) 404.

Local storage 406 can include volatile storage media (e.g., conventional DRAM, SRAM, SDRAM, or the like) and/or non-volatile storage media (e.g., magnetic or optical disk, flash memory, or the like). Storage media incorporated in local storage 406 can be fixed, removable or upgradeable as desired. Local storage 406 can be physically or logically divided into various subunits such as a system memory, a read-only memory (ROM), and a permanent storage device. The system memory can be a read-and-write memory device or a volatile read-and-write memory, such as dynamic random-access memory. The system memory can store some or all of the instructions and data that processing unit(s) 404 need at runtime. The ROM can store static data and instructions that are needed by processing unit(s) 404. The permanent storage device can be a non-volatile read-and-write memory device that can store instructions and data even when module 402 is powered down. The term "storage medium" as used herein includes any medium in which data can be stored indefinitely (subject to overwriting, electrical disturbance, power loss, or the like) and does not include carrier waves and transitory electronic signals propagating wirelessly or over wired connections.

Local storage 406 can store one or more software programs to be executed by processing unit(s) 404, such as an operating system and/or programs implementing various server functions such as functions of the system 100, or any other system described herein, or any other server(s) associated with the system 100 or any other system described herein.

"Software" refers generally to sequences of instructions that, when executed by processing unit(s) 404 cause server system 400 (or portions thereof) to perform various operations, thus defining one or more specific machine implementations that execute and perform the operations of the software programs. The instructions can be stored as firmware residing in read-only memory and/or program code stored in non-volatile storage media that can be read into volatile working memory for execution by processing unit(s) 404. Software can be implemented as a single program or a collection of separate programs or program modules that interact as desired. From local storage 406 (or non-local storage described below), processing unit(s) 404 can retrieve program instructions to execute and data to process in order to execute various operations described above.

In some server systems 400, multiple modules 402 can be interconnected via a bus or other interconnect 408, forming a local area network that supports communication between modules 402 and other components of server system 400. Interconnect 408 can be implemented using various technologies including server racks, hubs, routers, etc.

A wide area network (WAN) interface 410 can provide data communication capability between the local area network (interconnect 408) and a larger network, such as the Internet. Conventional or other activities technologies can be used, including wired (e.g., Ethernet, IEEE 802.3 standards) and/or wireless technologies (e.g., Wi-Fi, IEEE 802.11 standards).

Local storage 406 can provide working memory for processing unit(s) 404, providing fast access to programs and/or data to be processed while reducing traffic on interconnect 408. Storage for larger quantities of data can be provided on the local area network by one or more mass storage subsystems 412 that can be connected to interconnect 408. Mass storage subsystem 412 can be based on magnetic, optical, semiconductor, or other data storage media. Direct attached storage, storage area networks, network-attached storage, and the like can be used. Any data stores or other collections of data described herein as being produced, consumed, or maintained by a service or server can be stored in mass storage subsystem 412. Additional data storage resources may be accessible via WAN interface 410 (potentially with increased latency).

Server system 400 can operate in response to requests received via WAN interface 410. For example, one of modules 402 can implement a supervisory function and assign discrete tasks to other modules 402 in response to received requests. Conventional work allocation techniques can be used. As requests are processed, results can be returned to the requester via WAN interface 410. Such operation can generally be automated. WAN interface 410 can connect multiple server systems 400 to each other, providing scalable systems capable of managing high volumes of activity. Conventional or other techniques for managing server systems and server farms (collections of server systems that cooperate) can be used, including dynamic resource allocation and reallocation.

Server system 400 can interact with various user-owned or user-operated devices via a wide-area network such as the Internet. An example of a user-operated device is shown in FIG. 4 as client computing system 414. Client computing system 414 can be implemented, for example, as a consumer device such as a smartphone, other mobile phone, tablet computer, wearable computing device (e.g., smart watch, eyeglasses), desktop computer, laptop computer, and so on.

For example, client computing system 414 can communicate via WAN interface 410. Client computing system 414 can include conventional computer components such as processing unit(s) 416, storage device 418, network interface 420, user input device 422, and user output device 424. Client computing system 414 can be a computing device implemented in a variety of form factors, such as a desktop computer, laptop computer, tablet computer, smartphone, other mobile computing device, wearable computing device, or the like.

Processor 416 and storage device 418 can be similar to processing unit(s) 404 and local storage 406 described above. Suitable devices can be selected based on the demands to be placed on client computing system 414; for example, client computing system 414 can be implemented as a "thin" client with limited processing capability or as a high-powered computing device. Client computing system 414 can be provisioned with program code executable by processing unit(s) 416 to enable various interactions with server system 400 of a message management service such as accessing messages, performing actions on messages, and other interactions described above. Some client computing systems 414 can also interact with a messaging service independently of the message management service.

Network interface 420 can provide a connection to a wide area network (e.g., the Internet) to which WAN interface 410 of server system 400 is also connected. Network interface 420 can include a wired interface (e.g., Ethernet) and/or a wireless interface implementing various RF data communication standards such as Wi-Fi, Bluetooth, or cellular data network standards (e.g., 3G, 4G, LTE, etc.).

User input device 422 can include any device (or devices) via which a user can provide signals to client computing system 414; client computing system 414 can interpret the signals as indicative of particular user requests or information. User input device 422 can include any or all of a keyboard, touch pad, touch screen, mouse or other pointing device, scroll wheel, click wheel, dial, button, switch, keypad, microphone, and so on.

User output device 424 can include any device via which client computing system 414 can provide information to a user. For example, user output device 424 can include a display to display images generated by or delivered to client computing system 414. The display can incorporate various image generation technologies, e.g., a liquid crystal display (LCD), light-emitting diode (LED) including organic light-emitting diodes (OLED), projection system, cathode ray tube (CRT), or the like, together with supporting electronics (e.g., digital-to-analog or analog-to-digital converters, signal processors, or the like). A device such as a touchscreen that function as both input and output device can be used. Output devices 424 can be provided in addition to or instead of a display. Examples include indicator lights, speakers, tactile "display" devices, printers, and so on.

Some implementations include electronic components, such as microprocessors, storage and memory that store computer program instructions in a computer readable storage medium. Many of the features described in this specification can be implemented as processes that are specified as a set of program instructions encoded on a computer readable storage medium. When these program instructions are executed by one or more processing units, they cause the processing unit(s) to perform various operation indicated in the program instructions. Examples of program instructions or computer code include machine code, such as is produced by a compiler, and files including higher-level code that are executed by a computer, an electronic component, or a microprocessor using an interpreter. Through suitable programming, processing unit(s) 404 and 416 can provide various functionality for server system 400 and client computing system 414, including any of the functionality described herein as being performed by a server or client, or other functionality associated with message management services.

It will be appreciated that server system 400 and client computing system 414 are illustrative and that variations and modifications are possible. Computer systems used in connection with the present disclosure can have other capabilities not specifically described here. Further, while server system 400 and client computing system 414 are described with reference to particular blocks, it is to be understood that these blocks are defined for convenience of description and are not intended to imply a particular physical arrangement of component parts. For instance, different blocks can be but need not be located in the same facility, in the same server rack, or on the same motherboard. Further, the blocks need not correspond to physically distinct components. Blocks can be configured to perform various operations, e.g., by programming a processor or providing appropriate control circuitry, and various blocks might or might not be reconfigurable depending on how the initial configuration is obtained. Implementations of the present disclosure can be realized in a variety of apparatus including electronic devices implemented using any combination of circuitry and software.

Having now described some illustrative implementations, it is apparent that the foregoing is illustrative and not limiting, having been presented by way of example. In particular, although many of the examples presented herein involve specific combinations of method acts or system elements, those acts and those elements can be combined in other ways to accomplish the same objectives. Acts, elements and features discussed in connection with one implementation are not intended to be excluded from a similar role in other implementations or implementations.

The hardware and data processing components used to implement the various processes, operations, illustrative logics, logical blocks, modules and circuits described in connection with the embodiments disclosed herein may be implemented or performed with a general purpose single- or multi-chip processor, a digital signal processor (DSP), an application specific integrated circuit (ASIC), a field programmable gate array (FPGA), or other programmable logic device, discrete gate or transistor logic, discrete hardware components, or any combination thereof designed to perform the functions described herein. A general purpose processor may be a microprocessor, or, any conventional processor, controller, microcontroller, or state machine. A processor also may be implemented as a combination of computing devices, such as a combination of a DSP and a microprocessor, a plurality of microprocessors, one or more microprocessors in conjunction with a DSP core, or any other such configuration. In some embodiments, particular processes and methods may be performed by circuitry that is specific to a given function. The memory (e.g., memory, memory unit, storage device, etc.) may include one or more devices (e.g., RAM, ROM, Flash memory, hard disk storage, etc.) for storing data and/or computer code for completing or facilitating the various processes, layers and modules described in the present disclosure. The memory may be or include volatile memory or non-volatile memory, and may include database components, object code components, script components, or any other type of information structure for supporting the various activities and information structures described in the present disclosure. According to an exemplary embodiment, the memory is communicably connected to the processor via a processing circuit and includes computer code for executing (e.g., by the processing circuit and/or the processor) the one or more processes described herein.

The present disclosure contemplates methods, systems and program products on any machine-readable media for accomplishing various operations. The embodiments of the present disclosure may be implemented using existing computer processors, or by a special purpose computer processor for an appropriate system, incorporated for this or another purpose, or by a hardwired system. Embodiments within the scope of the present disclosure include program products comprising machine-readable media for carrying or having machine-executable instructions or data structures stored thereon. Such machine-readable media can be any available media that can be accessed by a general purpose or special purpose computer or other machine with a processor. By way of example, such machine-readable media can comprise RAM, ROM, EPROM, EEPROM, or other optical disk storage, magnetic disk storage or other magnetic storage devices, or any other medium which can be used to carry or store desired program code in the form of machine-executable instructions or data structures and which can be accessed by a general purpose or special purpose computer or other machine with a processor. Combinations of the above are also included within the scope of machine-readable media. Machine-executable instructions include, for example, instructions and data which cause a general purpose computer, special purpose computer, or special purpose processing machines to perform a certain function or group of functions.

The phraseology and terminology used herein is for the purpose of description and should not be regarded as limiting. The use of "including" "comprising" "having" "containing" "involving" "characterized by" "characterized in that" and variations thereof herein, is meant to encompass the items listed thereafter, equivalents thereof, and additional items, as well as alternate implementations consisting of the items listed thereafter exclusively. In one implementation, the systems and methods described herein consist of one, each combination of more than one, or all of the described elements, acts, or components.

Any references to implementations or elements or acts of the systems and methods herein referred to in the singular can also embrace implementations including a plurality of these elements, and any references in plural to any implementation or element or act herein can also embrace implementations including only a single element. References in the singular or plural form are not intended to limit the presently disclosed systems or methods, their components, acts, or elements to single or plural configurations. References to any act or element being based on any information, act or element can include implementations where the act or element is based at least in part on any information, act, or element.

Any implementation disclosed herein can be combined with any other implementation or embodiment, and references to "an implementation," "some implementations," "one implementation" or the like are not necessarily mutually exclusive and are intended to indicate that a particular feature, structure, or characteristic described in connection with the implementation can be included in at least one implementation or embodiment. Such terms as used herein are not necessarily all referring to the same implementation. Any implementation can be combined with any other implementation, inclusively or exclusively, in any manner consistent with the aspects and implementations disclosed herein.

Where technical features in the drawings, detailed description or any claim are followed by reference signs, the reference signs have been included to increase the intelligibility of the drawings, detailed description, and claims. Accordingly, neither the reference signs nor their absence have any limiting effect on the scope of any claim elements.

Systems and methods described herein may be embodied in other specific forms without departing from the characteristics thereof. Further relative parallel, perpendicular, vertical or other positioning or orientation descriptions include variations within +/−10% or +/−10 degrees of pure vertical, parallel or perpendicular positioning. References to "approximately," "about" "substantially" or other terms of degree include variations of +/−10% from the given measurement, unit, or range unless explicitly indicated otherwise. Coupled elements can be electrically, mechanically, or physically coupled with one another directly or with intervening elements. Scope of the systems and methods described herein is thus indicated by the appended claims, rather than the foregoing description, and changes that come within the meaning and range of equivalency of the claims are embraced therein.

The term "coupled" and variations thereof includes the joining of two members directly or indirectly to one another. Such joining may be stationary (e.g., permanent or fixed) or moveable (e.g., removable or releasable). Such joining may be achieved with the two members coupled directly with or to each other, with the two members coupled with each other using a separate intervening member and any additional intermediate members coupled with one another, or with the two members coupled with each other using an intervening member that is integrally formed as a single unitary body with one of the two members. If "coupled" or variations thereof are modified by an additional term (e.g., directly coupled), the generic definition of "coupled" provided above is modified by the plain language meaning of the additional term (e.g., "directly coupled" means the joining of two members without any separate intervening member), resulting in a narrower definition than the generic definition of "coupled" provided above. Such coupling may be mechanical, electrical, or fluidic.

References to "or" can be construed as inclusive so that any terms described using "or" can indicate any of a single, more than one, and all of the described terms. A reference to "at least one of 'A' and 'B'" can include only 'A', only 'B', as well as both 'A' and 'B'. Such references used in conjunction with "comprising" or other open terminology can include additional items.

Modifications of described elements and acts such as variations in sizes, dimensions, structures, shapes and proportions of the various elements, values of parameters, mounting arrangements, use of materials, colors, orientations can occur without materially departing from the teachings and advantages of the subject matter disclosed herein. For example, elements shown as integrally formed can be constructed of multiple parts or elements, the position of elements can be reversed or otherwise varied, and the nature or number of discrete elements or positions can be altered or varied. Other substitutions, modifications, changes and omissions can also be made in the design, operating conditions and arrangement of the disclosed elements and operations without departing from the scope of the present disclosure.

References herein to the positions of elements (e.g., "top," "bottom," "above," "below") are merely used to describe the orientation of various elements in the FIGURES. The orientation of various elements may differ according to other exemplary embodiments, and that such variations are intended to be encompassed by the present disclosure.

What is claimed is:

1. A method, comprising:
   determining, by one or more processors of a head mounted display (HMD), a first position of an object detected to be in view of a user of the HMD and a first expected gaze direction towards the first position using the first position of the object and a second position of each eye of the user;
   determining, by the one or more processors, a second gaze direction using an eye tracking operation of the HMD; and
   calibrating, by the one or more processors, based at least on a difference between a plane of the first expected gaze direction and the second gaze direction, the eye tracking operation of the HMD.

2. The method of claim 1, further comprising determining, by the one or more processors, the first expected gaze direction from the first position of the object to an expected position of each eye of the user.

3. The method of claim 1, further comprising determining, by the one or more processors, a first plane of the first expected gaze direction and a second plane of the second gaze direction, wherein the difference between the first gaze direction and the second gaze direction is based at least on a difference between the first plane and the second plane.

4. The method of claim 1, further comprising detecting, by one or more sensors of the HMD, that the user is gazing at the object responsive to at least one of an interaction of the user with the object or the user reading text associated with the object.

5. The method of claim 1, further comprising calibrating a varifocal system based at least on the first expected gaze direction and the second gaze direction.

6. The method of claim 1, further comprising operating a machine learning model for at least one of the eye tracking operation, the calibration of the eye tracking operation, or slip compensation.

7. A system, comprising:
   one or more processors configured to:
      determine a first position of an object detected to be in view of a user of a head mounted display (HMD) and a first expected gaze direction towards the first position using the first position of the object;
      determine a second gaze direction based on at least a second position of one or more eyes of the user of the HMD gazing at the object;
      determine a first plane of the first expected gaze direction and a second plane of the second gaze direction; and
      calibrate, based at least on a difference between the first expected gaze direction and the second gaze direction, an eye tracking operation of the HMD, wherein the difference between the first expected gaze direction and the second gaze direction is based at least on a difference between the first plane and the second plane.

8. The system of claim 7, wherein the one or more processors are further configured to determine the first expected gaze direction from the first position of the object to an expected position of the one or more eyes of the user.

9. The system of claim 7, wherein the one or more processors are further configured to determine the second gaze direction using the eye tracking operation.

10. The system of claim 7, wherein the one or more processors are further configured to determine that the user is gazing at the object responsive to at least one of an interaction of the user with the object or the user reading text associated with the object.

11. The system of claim 7, wherein the one or more processors are further configured to calibrate a varifocal system based at least on the first expected gaze direction and the second gaze direction.

12. The system of claim 7, wherein the one or more processors are further configured to operate a machine learning model for at least one of the eye tracking operation, the calibration of the eye tracking operation, or slip compensation.

13. A non-transitory computer-readable medium comprising processor-executable instructions that when executed by one or more processors, cause the one or more processors to:
   determine a first position of an object detected to be in view of a user of a head mounted display (HMD) and a first predicted gaze direction towards the first position using the first position of the object;

determine a second gaze direction based on at least a second position of one or more eyes of the user of the HMD gazing at the object;

determine a first plane of the first predicted gaze direction and a second plane of the second gaze direction; and calibrate, based at least on a difference between the first predicted gaze direction and the second gaze direction, an eye tracking operation of the HMD, wherein the difference between the first predicted gaze direction and the second gaze direction is based at least on a difference between the first plane and the second plane.

14. The non-transitory computer-readable medium of claim 13, further comprising instructions that cause the one or more processors to determine the first predicted gaze direction from the first position of the object to an expected position of the one or more eyes of the user.

15. The non-transitory computer-readable medium of claim 13, further comprising instructions that cause the one or more processors to determine the second gaze direction using the eye tracking operation.

16. The non-transitory computer-readable medium of claim 13, further comprising instructions that cause the one or more processors to calibrate a varifocal system based at least on the first predicted gaze direction and the second gaze direction.

17. The non-transitory computer-readable medium of claim 13, further comprising instructions that cause the one or more processors to operate a machine learning model for at least one of the eye tracking operation, the calibration of the eye tracking operation, or slip compensation.

* * * * *